United States Patent
Heemstra

(10) Patent No.: US 10,624,186 B2
(45) Date of Patent: Apr. 14, 2020

(54) LIGHTING DEVICE

(71) Applicant: SIGNIFY HOLDING B.V., Eindhoven (NL)

(72) Inventor: Tewe Hiepke Heemstra, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/337,918

(22) PCT Filed: Sep. 21, 2017

(86) PCT No.: PCT/EP2017/073907
§ 371 (c)(1),
(2) Date: Mar. 28, 2019

(87) PCT Pub. No.: WO2018/060049
PCT Pub. Date: Apr. 5, 2018

(65) Prior Publication Data
US 2019/0230767 A1    Jul. 25, 2019

(30) Foreign Application Priority Data

Sep. 21, 2016 (EP) .................................... 16191293

(51) Int. Cl.
*H05B 37/02*    (2006.01)
*G02B 5/02*    (2006.01)

(52) U.S. Cl.
CPC ......... *H05B 37/029* (2013.01); *G02B 5/0231* (2013.01); *H05B 37/0227* (2013.01)

(58) Field of Classification Search
CPC ................ H05B 37/02; H05B 37/0209; H05B 37/0227; H05B 37/029; G02B 5/02;
(Continued)

(56) References Cited

U.S. PATENT DOCUMENTS 4,976,582 A    12/1990   Clavel
7,824,059 B1 *   11/2010   Swarens .................... F21S 8/02
                                                                     362/146

(Continued)

FOREIGN PATENT DOCUMENTS

GB          2389192 A    12/2003
JP         2012018880 A    1/2012
(Continued)

*Primary Examiner* — Jason Crawford
(74) *Attorney, Agent, or Firm* — Daniel J. Piotrowski

(57) ABSTRACT

A lighting device comprises an optical deglaring plate and a lighting assembly arranged in optical communication with the plate and comprising a plurality of light sources for projecting a plurality of luminous outputs onto an incident surface of the deglaring plate. The projected luminous outputs together generate a luminous pattern on the incident surface of the plate. The optical deglaring plate comprises an array of conical optical structures for optically processing the generated luminous pattern in order thereby to produce a corresponding lighting display on a reverse side of the plate. A controller is provided to control a configuration of the lighting assembly so as to vary the generated luminous pattern in dependence upon one or more variables, and thereby correspondingly vary the produced visible lighting display. The variables may, in particular examples, include a time variable and/or may include a tracked position of an observer relative to the device.

11 Claims, 6 Drawing Sheets

(58) Field of Classification Search
CPC .... G02B 5/0205; G02B 5/021; G02B 5/0231; G02B 26/08; F21V 5/007; F21V 7/0008; F21V 7/0025; F21V 7/0083; F21V 14/02; F21V 14/025; F21V 14/04; F21V 14/05
See application file for complete search history.

(56) References Cited

U.S. PATENT DOCUMENTS

| | | | | |
|---|---|---|---|---|
| 9,316,380 | B2* | 4/2016 | Noh | G02B 3/0056 |
| 10,061,150 | B2* | 8/2018 | Yamamoto | G02F 1/133504 |
| 2006/0204718 | A1* | 9/2006 | Kawakami | G02B 5/02 428/141 |
| 2007/0064425 | A1* | 3/2007 | Frecska | F21S 8/04 362/253 |
| 2007/0263388 | A1* | 11/2007 | Lai | F21S 8/086 362/287 |
| 2009/0103293 | A1* | 4/2009 | Harbers | F21V 9/40 362/231 |
| 2010/0135027 | A1* | 6/2010 | Lai | F21V 5/02 362/311.01 |
| 2011/0175533 | A1* | 7/2011 | Holman | E04B 9/32 315/130 |
| 2014/0252249 | A1* | 9/2014 | Doros | F21V 5/008 250/504 R |
| 2014/0306612 | A1* | 10/2014 | Woodgate | F21V 23/0471 315/153 |
| 2015/0205016 | A1* | 7/2015 | Hesse | G02B 5/0294 359/599 |
| 2015/0219319 | A1 | 8/2015 | Li et al. | |
| 2016/0230952 | A1* | 8/2016 | Dingemans | F21S 8/026 |
| 2016/0230957 | A1* | 8/2016 | Savvateev | G02B 6/0096 |
| 2017/0114983 | A1* | 4/2017 | Wang | G02B 5/0231 |
| 2017/0122533 | A1* | 5/2017 | Wang | F21V 5/007 |
| 2017/0175978 | A1* | 6/2017 | Geisler | F21S 8/00 |
| 2019/0203909 | A1* | 7/2019 | Heemstra | F21V 5/007 |

FOREIGN PATENT DOCUMENTS

| | | |
|---|---|---|
| WO | 2015095189 A1 | 6/2014 |
| WO | 2015009795 A1 | 1/2015 |

* cited by examiner

LIGHTING DEVICE

CROSS-REFERENCE TO PRIOR APPLICATIONS

This application is the U.S. National Phase application under 35 U.S.C. § 371 of International Application No. PCT/EP2017/073907, filed on Sep. 21, 2017 which claims the benefit of European Patent Application No. 16191293.6, filed on Sep. 29, 2016. These applications are hereby incorporated by reference herein.

FIELD OF THE INVENTION

This invention relates to a lighting device, in particular to a lighting device for producing a lighting display on an optical deglaring plate.

BACKGROUND OF THE INVENTION

Decorative lighting devices, for providing ornamental luminous displays, are increasing in popularity. One known example of a decorative lighting device makes use of a so-called 'conical deglaring plate' which comprises a light transmissive array of cone-shaped structures, distributed on a supporting substrate. When spots of light are directed onto a surface of the deglaring plate, the spots are each transformed by the structure of the plate into a corresponding circular shaped light pattern visible on a reverse side of the plate.

Known devices incorporating such plates typically utilise them to provide attractive luminous displays of circles and other closed curved forms. In some cases, the structure of the plate is configured such that an apparent brightness or shape of the circular patterns appears to change as a user moves their position relative to the visible surface of the plate.

WO 2015/095189 A1 for example discloses a number of different prismatic deglaring plates, each comprising an array of micro-prism structures adapted to generate visible light patterns for an observer. Each plate is formed by adapting the micro-prism shape, pitch and/or arrangement to generate different effects, which includes light patterns which appear to change in dependence upon user position (e.g. changing brightness, or sparkle effects).

However, it remains a challenge, using such arrangements, to generate light outputs whose patterns are sufficiently interesting to capture and hold the attention of observers. In particular, observers may quickly grow uninterested or bored of the patterns produced by the device, so that creating a display which can remain fully captivating to onlookers for an extended period of time is far from straightforward.

There is a need therefore for conical deglaring plate based lighting devices capable of producing more interesting or captivating luminous displays.

SUMMARY OF THE INVENTION

The invention is defined by the claims.

It has been realised by the inventors of the invention that currently known optical deglaring plate-based devices tend to have an optical structure, and to generate luminous displays, which are substantially static in character. Although the static optical structure may be configured in some cases such that an apparent brightness or shape of the circular patterns appears to change as a user moves, there remains an absence of any true dynamic aspect to the achieved luminous patterns. Lighting devices offering improved levels of interest and engagement for observers may be achieved, it has therefore been realised, by incorporation of some dynamic component to the structure or operation of the device.

Accordingly, examples in accordance with an aspect of the invention provide a lighting device, comprising an optical deglaring plate comprising an array of conical optical structures for optically processing received light;

a lighting assembly comprising a plurality of light sources, the lighting assembly being adapted to project a plurality of light outputs onto an incident surface of the optical deglaring plate, the light outputs combining to generate a luminous pattern on said incident surface; and a controller adapted to control a configuration of the lighting assembly so as to vary the luminous pattern in dependence upon one or more variables.

In the lighting device, one or more of the plurality of light sources are moveable relative to the optical deglaring plate, and the controller is adapted to control movement of said one or more light sources in order to vary the luminous pattern.

In preferable examples, the optical deglaring plate may be a conical deglaring plate, by which is meant a deglaring plate comprising an array of conical prism structures. The conical optical structures may refer therefore to conical prism structures. The conical deglaring plate comprises a substantially light-transmissive micro-structured prism surface, which provides a deglaring effect in the plane of the plate. Micro-prism structures populating the plate each have the form of a cone, with a shape optimised to achieve maximal deglaring, and also having the property of processing incident light so as to form a substantially circular light pattern on an alternate or reverse side of the plate. In use, the deglaring plate is typically oriented such that the bases of the micro-prism structures form a set of light entry surfaces for the plate and the tapered surfaces of the structures form a set of light exit surfaces of the plate.

By conical is meant having a basic shape which is at least substantially conical. The conical optical structures may include truncated conical structures, including structures having a truncated or pared cross section (for example a segmentally truncated or pared cross-section). In some cases, one or more of the conical structures may have an adapted base shape, for example a base being adapted to exhibit a polygonal shape. Such examples are intended to be covered by the general term 'conical structure'.

Examples which follow may be described primarily with reference to such a 'conical deglaring plate' by which is meant an optical deglaring plate comprising an array of conical optical structures for optically processing received light, and as further clarified in the preceding paragraph. In all cases however, reference to a conical deglaring plate is to be understood as referring to an optical deglaring plate comprising an array of conical optical structures for optically processing received light, and is not to be construed as introducing any further arbitrary limitation of the scope of the invention.

The invention is based on implementation of a dynamic control regime for a lighting device comprising an optical deglaring plate based lighting device, to thereby achieve a luminous pattern on the deglaring plate which dynamically changes and shifts as a function of one or more variables or parameters. A more exciting, eye-catching and interesting luminous display on a visible surface of the plate may thus be created.

A lighting assembly is provided comprising a plurality of individual light sources, each adapted to project a respective light output onto an incident surface of the optical deglaring plate. The combination of these light outputs produces an overall luminous display on the incident surface of the plate. In the case of a conical deglaring plate, each individual light output is processed by the deglaring plate to generate on a reverse (visible) surface of the plate a corresponding circular (or curve-shaped) light pattern. The plurality of these individual circular (or curve-shaped) light patterns together form an overall luminous display which is presented on visible surface of the plate. As the luminous pattern projected onto the incident surface of the plate varies as a function of the one or more variables, so the outwardly presented (optically processed) luminous display on the reverse side of the plate is caused to vary in response. There is thereby generated a dynamic light display composed of a plurality of shifting or changing arcuate or circular (or curve-shaped) light patterns.

For achieving the claimed design features and the claimed luminous effects, one or more of the plurality of light sources are moveable relative to the optical deglaring plate, and the controller is adapted to control movement of said one or more light sources in order to vary the luminous pattern.

Movement of the light sources of the lighting assembly effects a consequent movement in the incidence locations of the light outputs generated by each light source. The luminous pattern generated across the incident surface of the optical deglaring plate is thus controlled to vary. In consequence, the luminous display produced on the reverse (visible) side of the plate also varies. In particular, the movement of the light sources effects a corresponding movement in the displayed locations of the circular or curved luminous patterns generated on the visible surface of the deglaring plate. Hence, a dynamically moving light pattern is generated for presentation to observers.

In particular examples, where the optical deglaring plate defines a plane:

one or more of the light sources may be moveable in a direction parallel with said plane to thereby vary a relative positioning of a respective one or more luminous outputs within the luminous pattern, and/or one or more of the light sources may be moveable in a direction perpendicular with said plane to thereby vary a size of a respective one or more of the luminous outputs within the luminous pattern.

Movement of the light sources parallel with respect to the plane of the deglaring plate (i.e. laterally with respect to the plane) effects a translation of the light outputs across the incident surface and a corresponding translation of the generated circular or curved patterns across the visible surface of the plate.

Movement of the light sources perpendicular with respect to the plane of the deglaring plate changes the total area over which the luminous output is spread upon incidence on the deglaring plate. As the light source is moved further from the plate, so the size of the projected light 'spot' increases, and as the light source is moved closer, so the size of the generated light spot decreases. This is transferred to the visible surface of the plate, wherein movement of the light source further from the plate generates a circle or curve shape having a correspondingly larger radius (or larger radius of curvature), and vice versa.

Perpendicular motion of light sources thereby enables generation of a dynamic light display in which the component circle or curve shapes shift and change in size in dependence upon said one or more variables.

Naturally, as size of the projected light 'spot' increases, so the luminous output of the respective light source is spread over an ever greater area, and the incident intensity of the light proportionately decreases. To avoid the apparent brightness of the generated circle or curve shapes changing as their size is varied, the change in incident intensity may be compensated for.

In particular, according to one of more examples, the controller may be further adapted to vary an output intensity of each of said one or more moveable light sources in dependence upon a perpendicular displacement of each light source with respect to the optical deglaring plate. The output intensity may be increased as a function of increasing perpendicular distance from the deglaring plate.

Movement of the light sources relative to the optical deglaring plate represents one possible means for achieving circular or curve patterns on the visible plate surface which have the appearance of moving laterally across said surface.

In further examples, the plurality of light sources of the lighting assembly may form an array of independently addressable light sources, and the controller is adapted to vary the luminous pattern through sequential addressing of light sources within the array. By sequentially activating a series of neighbouring light sources populating such an array, the effect of a single moving light source may be imitated. If the pitch of the array is sufficiently small, this sequential activation scheme may achieve a luminous effect which is substantially indistinguishable to a typical observer to the effect generated by a single moving light source.

These alternative examples may confer the advantage of improved simplicity and robustness. By obviating the need to effect mechanical motion of light sources, operation is significantly simplified, and the number of parts reduced. Construction may therefore also be simpler, cheaper and less expensive.

To achieve a dynamic variation in the created luminous display, the light pattern projected onto the optical deglaring plate is controlled to vary as a function of one or more variables. A number of options exist for these variables.

In accordance with at least one subset of embodiments, the one or more variables may include a time variable, such that the luminous pattern is controlled to vary as a function of time.

Additionally or alternatively, in accordance with one or more embodiments, the lighting device may further comprise a position detection module adapted to determine a position of an observer, and the one or more variable parameters may include said determined position of an observer. For example, a positioning of one or more of the light sources relative to the deglaring plate might be controlled to change as a function of the determined user position.

The light source may for instance be controlled to increase or decrease in perpendicular distance from the deglaring plate in correspondence with increases or decreases in user position from the lighting device.

The light sources may be controlled to move laterally (parallel with the deglaring plate) in correspondence with a user's lateral position relative to the visible surface of the deglaring plate. In this way, one or more generated circular or curved patterns may be controlled to move so as to appear to follow an observer as they move relative to the device.

In accordance with at least one further subset of embodiments, the lighting assembly may comprise one or more light-shaping arrangements, each comprising at least one light source and at least one light shaping mask, arranged in the light path of the at least one light source, for altering a shape of a respective light output projected by the arrangement onto the optical deglaring plate. This may enable a shape of the corresponding generated visible luminous patterns to be correspondingly altered.

In particular examples, the light-shaping mask of at least one of said one or more light-shaping arrangements may have a sectorial shape for generating a sectorially shaped light output for projection onto the optical deglaring plate. A sectorially shaped light output on the incident surface has the effect of generating a corresponding arc-shaped luminous pattern on the visible surface of the plate (i.e. an open curve shape). The angular extent of the produced arc shape may match or be commensurate with the angular extent of the projected sectorial light pattern.

In further particular examples, the light shaping mask(s) of one or more of said light-shaping arrangements may be moveable relative to the optical deglaring plate, and the controller may be adapted to control movement of said light-shaping masks in order thereby to vary the luminous pattern. By moving the mask, the projected pattern may be moved on the surface of the plate.

The light-shaping arrangement may be moved as a single unit, for example translated laterally with respect to the deglaring plate. Alternatively, the light-shaping mask alone may be moved. This may comprise movement perpendicular to the deglaring plate for example. More preferably, this may involve rotational movement, wherein the mask is controlled to spin or revolve, for example about a local (possibly notional) axis extending through the mask. Rotation of the mask effects a corresponding rotation of the projected pattern on the deglaring plate, and a consequent corresponding motion of the generated luminous pattern on the reverse visible side of the deglaring plate.

In accordance with a particular set of examples, the device may comprise a plurality of said light-shaping arrangements axially aligned in a row extending perpendicularly with respect to the optical deglaring plate, the arrangements each adapted to be rotatable about a common axis of alignment, and wherein the controller is adapted to control rotation of each of the plurality of light-shaping arrangements in order thereby to vary the luminous pattern.

As discussed above, the size of the generated visible light pattern on the reverse side of the deglaring plate is a function of increasing distance of the light source from the deglaring plate. A perpendicularly aligned axial arrangement of light sources therefore has the effect of producing on the visible surface of the deglaring plate a corresponding set of concentrically arranged circular or curve-shaped patterns. Where the masks are sectorially shaped, there may be produced a pattern of concentric arc shapes. By rotating each of the light-shaping arrangements, the concentric arc shapes may be controlled to rotate, either synchronously for example, or at different rates, generating the effect of certain arcs turning within other arcs.

In a more particular set of examples, this plurality of light-shaping arrangements may be mounted axially along the length of a spindle, the spindle having a longitudinal axis, and wherein the controller is adapted to control rotation of said spindle about said longitudinal axis in order thereby to vary the luminous pattern. This generates synchronous rotation.

In accordance with the above described examples, the controller may further be adapted to vary an output intensity of the light source comprised by each light-shaping arrangement as a function of rotation angle.

It has been realised by the inventors that arrangements such as these may be implemented to provide not just an attractive lighting display, but also to provide generation of more complex patterns or even images. This arises from consideration of the fact that every image or shape may be represented or expressed in terms of a set of concentric arcs (i.e. may be represented in polar co-ordinates).

By providing light-shaping masks configured to produce only a very narrow sector (i.e. approximating a radial line), and by controlling the output intensity of each of the revolving light-shaping arrangements as a function of rotation angle, it is possible to control each arrangement to effectively project any arbitrary arc desired. Since the arrangement described above allows a set of concentric curves to be produced, this angularly-dependent control scheme allows any arbitrary image to be produced on the visible plate surface by constructing it from an appropriate set of concentric arcs.

In variations on the above example, each combination of a light source and a light-shaping mask might be instead replaced by a combination of a light source and a lens element, the lens element being configured to direct light into a sectorial shaped output, or a radially extending thin line. In this alternative arrangement, optical efficiency is increased, since light that would otherwise be lost as a result of absorption or deflection by the blocking portions of light-shaping masks is instead conserved and channelled into the sectorial output or the radial line shape. A brighter projected luminous pattern is therefore achievable (or the same brightness may be achieved with reduced power consumption). Substantially the same shape of light output is generated by this alternative arrangement as in the arrangement comprising a light-shaping mask. Hence, the capacity to project arbitrary arcs onto the deglaring plate and thereby construct arbitrary images is retained.

In accordance with any of the above described embodiments, further adaptations may additionally be provided in order to vary the generated light patterns on the visible surface of the optical deglaring plate. In particular, the optical structure or character of one or more of the conical optical structures forming the deglaring plate may be altered so as to change the optical effect produced by the plate.

In particular examples, one or more of said conical optical structures may have a segmentally truncated cross-section, the cross-section having the shape of a circle reduced by one or more segment portions, for generating an open curve shaped luminous pattern on a visible surface of the conical deglaring plate from the processing of received light.

By 'segmentally truncated cross-section' is meant that a shape of the structure is adapted such that its cross-section has the form of a circle absent one or more segments of the circle. 'Segment' is to be interpreted in its geometrical sense as indicating a portion of a circle delimited by an arc and a chord. The cross section thus has the form of a circle major arc which is closed or bounded by a chord.

The thus segmentally truncated cone has an outer surface which includes at least one planar surface section extending from the apex of the cone to the base of the cone. This planar surface section essentially defines the above-mentioned chord bounding the cross-section of the structure.

The effect of this is a conical structure adapted to process incident light so as to generate on the visible deglaring plate surface an arc shape having an angular extent approximately matching or commensurate with the angular extent of the remaining segmentally reduced cross-section. Symmetrically disposed between the two ends of the arc, and on the same circle as defines the arc is generated a point or dot of light, formed in place of the 'missing' arc shape of the circle that would otherwise have been formed. This dot of light is formed from the light that would otherwise have formed this missing arc shape, and hence outputs the same luminous flux as would have been output by this missing arc.

In accordance with further examples, one or more of the conical optical structures may have a cross-section which is truncated by removal of more than one segmental portion. In this case, an arc shape is generated on a visible surface of the deglaring plate in combination with a plurality of luminous dots or points, each aligned centrally along a respective 'missing' arc associated with the respective 'missing' segment.

In further examples still, the optical deglaring plate may comprise or include non-conically shaped prismatic optical structures, such as optical pyramid structures. In this case, no arc is created, but rather a set of symmetrically arranged dots or points, each aligned with a centre point of a respective one of the faces of the pyramid. Pyramid and cone structures may be combined in example optical plates to form a luminous pattern consisting of arc and circle shapes in combination with dot arrangements.

In accordance with one or more sets of embodiments, the optical deglaring plate may comprise at least one of:

a combination of conical optical structures and non-conical optical structures for optically processing received light; and a combination of segmentally truncated conical optical structures as described above, and non-truncated conical optical structures.

Where a deglaring plate is provided comprising a combination of non-truncated cones and segmentally truncated cones and/or a combination of conic structures and non-conic structures, there is generated on the visible side of the deglaring plate a pattern comprising a combination of circles, arcs, and dots. This may provide an interesting aesthetic effect, or may for example be utilised as part of the image-generating control regime described above to construct images from a set of concentric arcs, circles and/or dots.

Additionally or alternatively, there may be provided one or more light-shaping masks attached to surface(s) of one or more of said conical optical structures for altering said optical processing of the received light. The light shaping masks may be adhered covering a certain portion of one or more of the conical optical structures. The light shaping masks may cover a portion of a light exit surface of one or more of the conical optical structures for example. In particular, the one or more light shaping masks may be adapted to cover a sectorial portion of a tapered major surface of one or more the conical optical structures, extending from the base to the apex.

The light shaping masks may change the shape of the generated light patterns on the visible surface of the deglaring plate. In particular, by covering a sectorial portion of the tapered major surface, a corresponding sectorial-shape shadow is effectively cast through the otherwise circular cross-section of the conical structure. This results in the creation of arc-shaped luminous patterns on a reverse side of the deglaring plate rather than circular patterns. These may have an angular extent matching or commensurate with the angular extent of the remaining uncovered portion of the conical structure in question.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
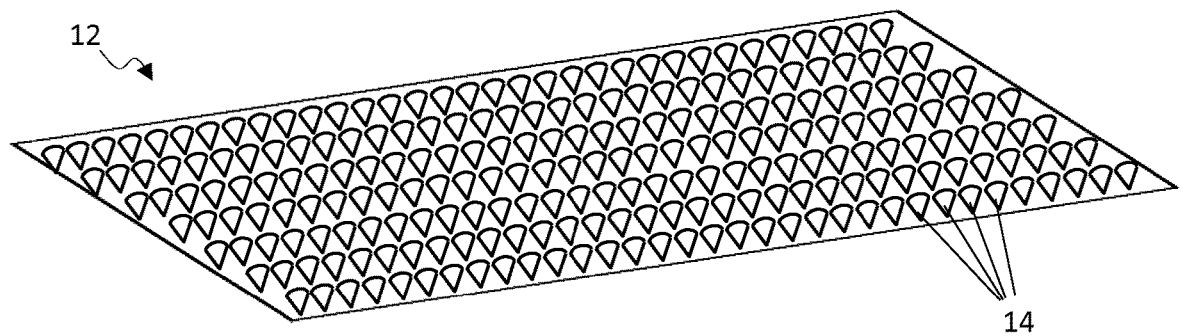
FIG. 1 schematically depicts an example optical deglaring plate.

It should be understood that the Figures are merely schematic and are not drawn to scale. It should also be understood that the same reference numerals are used throughout the Figures to indicate the same or similar parts.

The invention provides a lighting device comprising an optical deglaring plate and a lighting assembly arranged in optical communication with the plate and comprising a plurality of light sources for projecting a plurality of luminous outputs onto an incident surface of the deglaring plate. The projected luminous outputs together generate a luminous pattern on the incident surface of the plate. The optical deglaring plate comprises an array of conical optical structures for optically processing the generated luminous pattern in order thereby to produce a corresponding lighting display on a reverse side of the plate. A controller is provided to control a configuration of the lighting assembly so as to vary the generated luminous pattern in dependence upon one or more variables, and thereby correspondingly vary the produced visible lighting display. The variables may in particular examples include a time variable and/or may include a tracked position of an observer relative to the device.

Embodiments of the invention are based on the use of an optical deglaring plate to transform incident light into a particular luminous pattern visible on a reverse side. In particular, embodiments of the invention preferably make use of a 'conical deglaring plate', which, as described above, is composed an array of conical optical structures for optically processing the generated luminous pattern. A conical deglaring plate has the effect of transforming incident light into one or more curve-shaped luminous patterns.

The optical structure of a conical deglaring plate is schematically illustrated in FIG. 1 which depicts a base-side view of an example plate 12. The plate in accordance with this example comprises an array of conical optical structures 14 distributed in a planar formation. In examples, the deglaring plate may be an integrally formed body. The plate may be formed exclusively from the array of conical optical structures, the cones for example bonded contiguously to one another to form the structure of the plate. Alternatively, neighbouring conical structures may be disposed apart from one another, separated by a section of intermediary material for instance. This may be an optical (e.g. transmissive or translucent) material. More advantageously, it may be an (at least substantially) opaque material. Such a material may prevent a direct view of the (typically very bright) light sources from being exposed to observers, which would be undesirable for reasons for instance of comfort, safety and/or aesthetics. In further examples, the conical deglaring plate may comprise an optical base sheet, upon which are arrayed the plurality of optical structures.

Although the particular example deglaring plate of FIG. 1 comprises a planar arrangement of conical structures, in alternative examples the plate may exhibit some curvature, so as to define a continuous curved optical surface, rather than a plane.

FIG. 1 shows a base-side view of an example deglaring plate. In use, light is directed onto the 'upper' surface of the plate (the reverse side to that visible in FIG. 1), onto the bases of one or more of the conical optical structures. Light is processed as it passes through the structures, resulting in the generation of a virtual image or illusion of an illuminated ring which appears situated between the plate and the lamp.

One example conical deglaring plate having a structure in accordance with requirements of the invention is provided commercially by for instance Jungbecker (referred to as a 'conical deglaring prism').

In examples which follow, reference is made in particular to use of a conical deglaring plate. This is to be interpreted as referring to an optical deglaring plate as defined in claim 1 of the present invention and as clarified by the above description: an optical deglaring plate comprising an array of conical optical structures for optically processing the generated luminous pattern. The term is not to be construed therefore as introducing any additional arbitrary limitation the scope of the invention.

Figure 2:
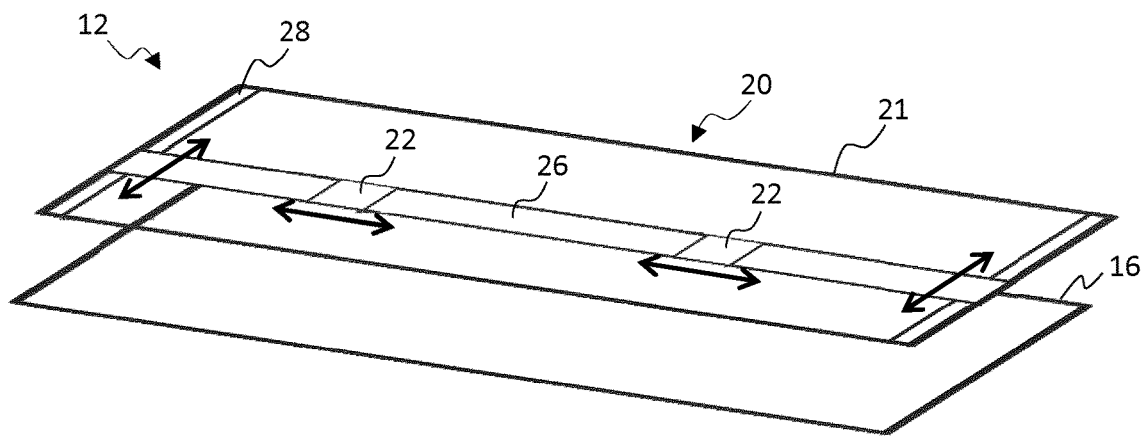
FIG. 2 schematically depicts a first example lighting device in accordance with one or more embodiments of the invention.

FIG. 2 schematically illustrates an exploded view of a first example lighting device 12 in accordance with an aspect of the invention. The device comprises a lighting assembly 20 arranged opposite a conical deglaring plate 16. The lighting assembly comprises a plurality of light sources 22, each having a light emitting surface arranged facing the conical deglaring plate. For simplicity of illustration, the lighting assembly is shown comprising only two light sources 22. However, in other examples, the assembly may comprise a greater number of light sources. The light sources are mounted movably to a first rail mechanism 26, the rail mechanism mounted to an outer frame structure 21. The rail mechanism enables each of the light sources to slide laterally along a direction parallel to a length-wise dimension of the conical deglaring plate beneath.

The first rail mechanism 26 is further mounted to a second surrounding pair of rails 28, these featuring a mechanism adapted to enable motion of the first rail along a direction parallel to a width-wise dimension of the conical deglaring plate 16. Through combined use of both the first 26 and second 28 rail mechanisms, two dimensional movement of the light sources relative to the conical deglaring plate may be achieved.

In examples, motion of the light source along the rail mechanism(s) may be achieved through use of a further provided motor mechanism. In addition, the lighting device further comprises a controller, configured to control motion of the light source relative to the conical deglaring plate.

Figure 3:
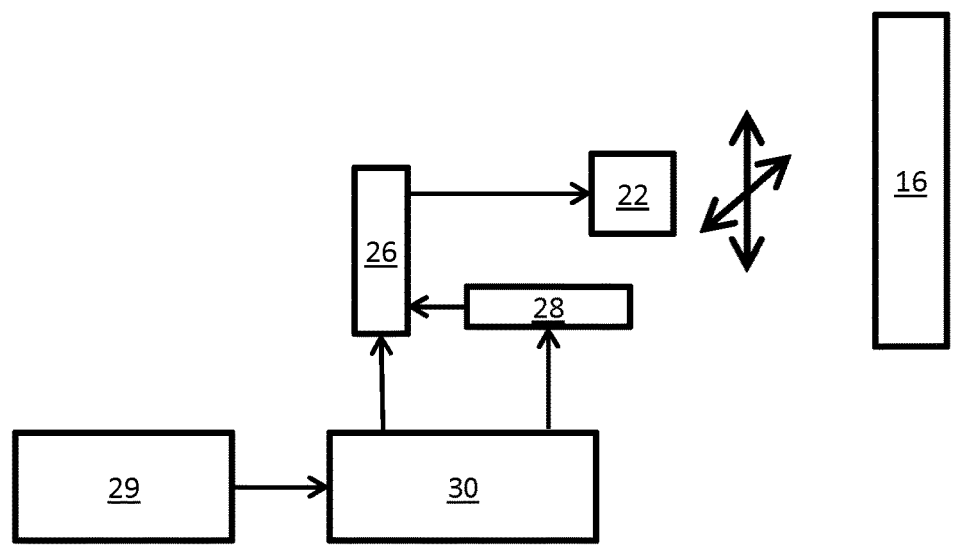
FIG. 3 shows a block diagram schematically illustrating an example control architecture for the first example lighting device.

FIG. 3 shows a block diagram schematically illustrating an example control architecture for the example lighting device of FIG. 1. A controller 29 is signally connected to a motor mechanism 30, and adapted to output control signals for controlling the operation of the motor mechanism. The motor mechanism is operatively connected with the light sources 22 via the two rail mechanisms 26, 28. In particular, the motor mechanism is mechanically connected with the rail mechanisms for effecting movement in the rail mechanisms.

The light sources 22 are mechanically coupled to the first rail mechanism 26 such that motion in the first rail mechanism effects corresponding movement of the light sources 22 relative to the conical deglaring plate 16. The first rail mechanism 26 is mechanically coupled to the second rail mechanism 28 such that motion in the second rail mechanism effect a corresponding motion of the first rail mechanism (and through it, the light sources) relative to the conical deglaring plate 16.

The motor mechanism 30 is adapted to provide independent control of each of the first and second rail mechanisms to thereby enable two-dimensional motional control of the position of the light sources 22 relative to the conical deglaring plate 16.

In further examples, two separate, dedicated motor mechanisms may be provided for mechanically manipulating each of the first 26 and second 28 rail mechanisms.

In particular examples, the controller 29 may be configured to change a position of the light sources 22 as a function of time. It may move the light sources in accordance with a pre-determined time-dependent movement routine for example. The routine may loop to provide continuous motion on the basis of a finite set of control instructions.

Figure 4:
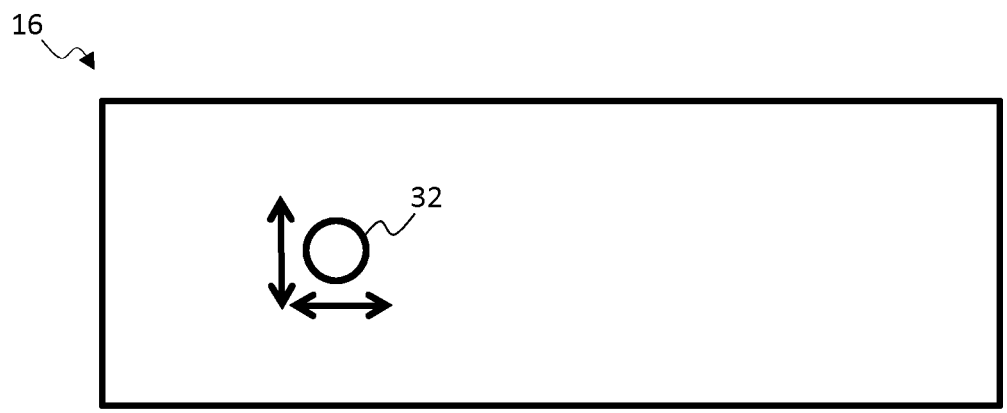
FIG. 4 schematically illustrates an example luminous display generated on a visible surface of the example lighting device of FIG. 2.

Each light source 22 has a light emitting surface which faces the conical deglaring plate 16. The light source 22 is configured to project a light output onto the surface of the conical deglaring plate. As discussed above, the structure of the plate is such as to generate from the projected light output a corresponding circle of light on the reverse side of the plate. This is illustrated schematically in FIG. 4.

As each light source 22 moves relative to the conical deglaring plate 16, the visible circle of light 32 moves across the visible surface of the plate in a corresponding fashion. This dynamic motion of the circular light pattern creates an interesting and eye-catching luminous display.

Figure 5:
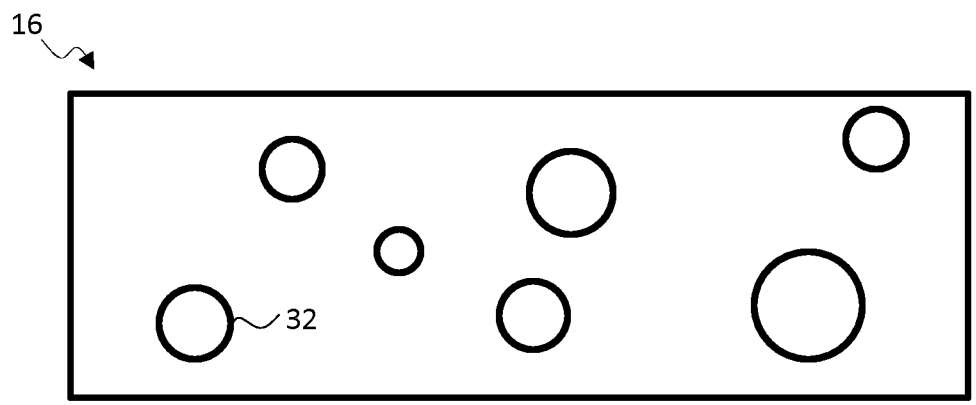
FIG. 5 further schematically illustrates an example luminous display generated on a visible surface of the example lighting device of FIG. 2.

In further embodiments, a larger number (for example 10 or more, or more preferably 15 or more, or even more preferably 20 or more) of light sources are provided movably mounted within the lighting device and a corresponding plurality of moving visible circles thereby created, appearing to move across the visible surface of the deglaring plate 16. This is illustrated schematically in FIG. 5 which shows a number of circles 32 of different sizes displayed across the front of a deglaring plate in accordance with embodiments of the invention. Differently sized circles are generated by means of light sources positioned at different distances from the conical deglaring plate for instance.

In addition to changes in position, examples of the invention may further implement colour changing functionality for one or more of the light sources. One or more of the light sources may be adapted to generate light in any of a range of different colours, and the controller 29 may be adapted to control changes in the light colour in dependence upon one or more variables. As in the case for controlled movements, these variables may include a time variable, so that colours of one or more of the visible circles change as a function of time. This variation may be combined with movement of the light sources 22 by means of the rail mechanisms 26, 28 to thereby create an impressive and exciting display of moving and colour-changing circular patterns.

Although a rail mechanism is provided to facilitate motion of the light sources relative to the conical deglaring plate in the example of FIG. 1, in further examples, alternative movement mechanisms might be provided. These might include any form of actuation means for effective movement of the light sources. In examples, an array of light sources might be provided, each moveable across only a limited local span of distances, but wherein collectively, the full array of light sources are together capable of covering the entire expanse of the conical deglaring plate.

This may be implemented in accordance with one or more examples by mounting each light source 22 on a Delta robot of a sort disclosed for example in document U.S. Pat. No. 4,976,582.

In further alternative examples, a wire mechanism may be implemented, wherein each light source 22 is provided coupled to one or more drive wires, suspended tautly above the conical deglaring plate, extending for instance between two opposing points on the outer frame structure 21. The drive wires may be coupled at each end to a respective motorised spool or coil operable to wind out or wind in the wire. By controlling the spools to wind in parallel directions, a light source coupled to the wire at a point between the two end-points may be controlled to move in the direction of the winding spools.

Light sources 22 may be attached to multiple such wires for instance, each for manipulating the position of the light source in a different linear direction.

FIG. 2 shows an exploded view of the relative arrangement of the lighting assembly and conical deglaring plate. In embodiments of the invention, these two components may be mounted within a housing structure to form a robust lighting device for installation in a space. In examples, outer walls of the housing may delimit an internal cavity within which the lighting assembly 20 and conical deglaring plate 16 are mounted. The internal cavity may have internal surfaces which are light absorbing (e.g. black). This may help to maximise the achieved optical effect by maximising apparent contrast and minimising transmission of stray light from the device (which might otherwise interfere with the achieved luminous effect).

In accordance with any embodiment of the invention, the light sources 22 may comprise solid state light sources, for instance LED light sources. LED light sources confer the advantage of high luminous output, high efficiency, long lifetime, fast switching, and low heat generation.

Other kinds of light source might alternatively be used however. These may include incandescent or fluorescent light sources for instance.

Also in accordance with any embodiment of the invention, a radial radiation profile of the light sources 22 may be optimised in order to achieve approximately uniform apparent brightness of the light to an observer as a function of viewing angle. A lens or other optical element may be provided in combination with each light source, or the intrinsic optics of the light source itself may be adapted, so as to shape the outgoing luminous profile of the light source.

The outgoing light may be optically processed so as to direct a higher concentration of light than normal (e.g. a normal output profile may be Lambertian) to more external radial points within the luminous output profile (or beam). More light than usual is in this way directed to more radially peripheral points within the output beam. This may compensate for perceived reduction in brightness when the output of the light is viewed at more oblique angles with respect to the light source (i.e. from locations further away from the light source and therefore at shallower angles).

Such manipulation techniques are well-known within the field of lighting to compensate for apparent brightness drops, and means for implementing such features in embodiments of the present invention will be readily apparent to the skilled person in this field.

In the example of FIG. 2, two-dimensional lateral motion of a plurality of light sources 22 relative to the conical deglaring plate 16 is achieved by means of one or more motor or actuation mechanisms configured to physically manipulate a position of each of the light sources relative to the plate. However, the resultant lighting effect generated across the visible surface of the conical deglaring plate, of apparently moving circles (or closed loops) of light, may be achieved in further examples by other control means.

Figure 6:
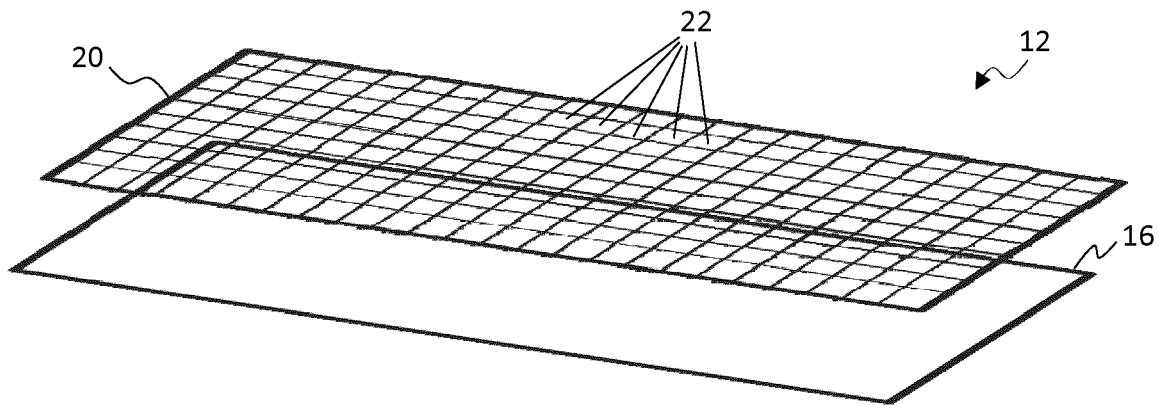
FIG. 6 schematically depicts a second example lighting device in accordance with one or more embodiments of the invention.

In FIG. 6 is illustrated one example of a lighting device in accordance with embodiments of the invention configured to generate a moving luminous effect by an alternate means. The device 12 comprises a lighting assembly arranged in opposition to a conical deglaring plate 16, wherein the assembly comprises an array of lighting sources 22, each individually addressable, and each having a light-emitting surface facing the conical deglaring plate. A controller (not shown) is adapted to control the array of light sources so as to simulate physical motion of a single light source relative to the plate through sequential activation of an appropriate set of adjacently positioned individual light sources. In this way, a luminous pattern featuring any number of apparently moving circles (or closed loops) of light may be created on the visible surface of the conical deglaring plate.

Figure 7:
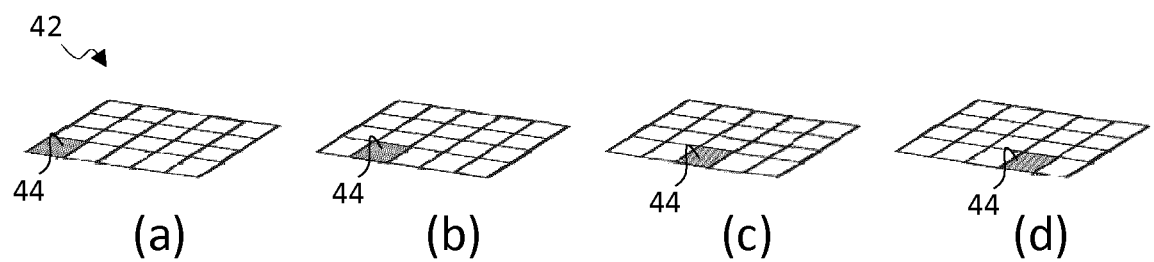
FIG. 7 schematically illustrates a principle of operation of the example lighting device of FIG. 5.

This control scheme is illustrated in FIG. 7 which shows a sample section 42 of the light source array of FIG. 6 in which a series of light sources 44 are sequentially activated in order to simulate motion of a single light source. Each of FIGS. 6 (*a*)-(*d*) show the sample section 42 of the array at a series of different time points, each separated by a small time delay. In each case, a consecutively positioned different light source 44 is activated, and all other light sources de-activated. The time delay may, by way of example, be in the order of 0.01 seconds (e.g. approximately 0.05 seconds), or 0.001 seconds for example. As sequential light sources are activated in quick succession in this way, apparent motion of a single luminous pattern is simulated across the visible surface of the conical deglaring plate 16.

The particular pattern of sequentially illuminated light sources 44 illustrated in FIG. 7 is shown by way of illustration of the control concept only. In accordance with further examples, any desired row, column, line or set of light sources might instead be sequentially activated in this way in order to generate the appearance of a single light source moving in any desired path across the conical deglaring plate.

A plurality of such sequential activation patterns may, in examples, be implemented simultaneously across the light source array to give the impression of a plurality of moving light sources and corresponding circular or closed loop luminous patterns.

In above example lighting devices, motion (or apparent motion) of a plurality of light sources 22 relative to the conical deglaring plate 16 has been demonstrated for motion parallel with a plane of the deglaring plate. In further examples, motion of light sources in a direction perpendicular with respect to the conical deglaring plate may also be achieved.

Figure 8:
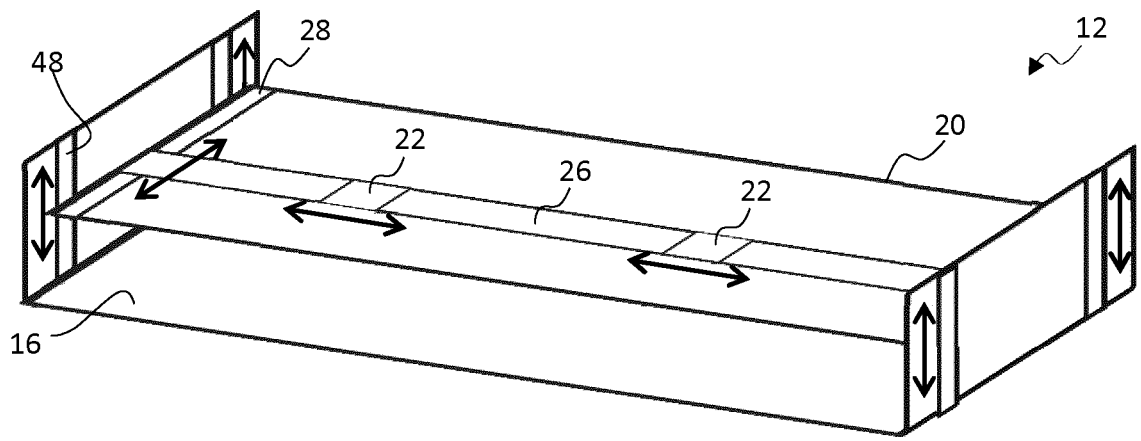
FIG. 8 schematically depicts a third example lighting device in accordance with one or more embodiments of the invention.

An example of such an embodiment is illustrated in FIG. 8 which shows an example lighting device 12 in accordance with an embodiment of the invention in which a lighting assembly 20 is provided mounted moveably with respect to a conical deglaring plate 16. The lighting assembly is supported at each of its two ends by a respective pair of motorised rail mechanisms 48 operable to change a relative displacement of the lighting assembly with respect to the conical deglaring plate. The rail mechanisms are aligned perpendicularly with respect to a plane defined by the lighting assembly, and are hence operable to displace the lighting assembly perpendicularly with respect to the conical deglaring plate.

As discussed above, the structure of the deglaring plate 16 is such that projection of a light spot onto the plate has the effect of generating on a reverse side of the plate a circular (or closed loop) shaped luminous pattern. The size (e.g. radius) of the generated loop pattern is dependent upon the distance of the projecting light source from the incident surface of the plate: the greater the distance between the light source and the plate, the larger the generated circular light pattern.

The effect of adjusting the perpendicular displacement of the lighting assembly 20 relative to the conical deglaring plate 16 hence is to change the size of the various circular light patterns generated on the visible surface of the plate by the particular light sources 22 comprised by the lighting assembly 20.

Figure 9:
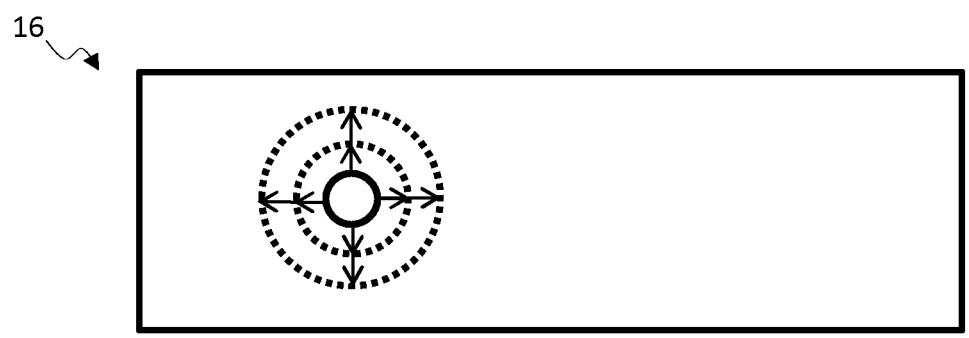
FIG. 9 schematically illustrates an example luminous display generated on a visible surface of the example lighting device of FIG. 7.

This is illustrated in FIG. 9 which schematically illustrates changes in the diameter of an example circular light pattern as a light source of an example lighting assembly 20 is moved further away from the conical deglaring plate 16. As the distance between the lighting assembly and the deglaring plate increases, the size of the generated light pattern increases accordingly. Hence by adjusting the displacement of the lighting assembly, the sizes of each of the circular light patterns being generated by light sources of that assembly may be altered.

Positioning of the lighting assembly 20 along a direction perpendicular to the conical deglaring plate 16 may be controlled by a further provided controller (not shown) in dependence upon one or more variables. By way of example, these variables may include a time variable, so that the perpendicular relative positioning of the lighting assembly is controlled to vary as function of time.

In examples, adjustment of the lighting assembly 20 in a direction perpendicular with respect to the conical deglaring plate 16 may be combined with adjustment (or simulated adjustment) of the lateral positioning of the light sources 22 populating the lighting assembly. In this way a dynamic, exciting luminous display may be created featuring laterally moving circular light patterns which exhibit changing sizes and diameters.

In accordance with one or more particular examples, the controller may be configured to adjust a luminous output power of one or more of the light sources 22 of the lighting assembly 20 as a function of perpendicular displacement of the lighting assembly relative to the conical deglaring plate 16. For a light source emitting at a constant output power, the apparent incident brightness of the projected pattern decreases as a function of its distance from the incident surface (since the output luminous flux is spread over a greater area). By appropriately adjusting the output luminous power as a function of the distance of the light source from the conical deglaring plate, this change in apparent brightness may be compensated for. In particular, the output power may be increased as a function of increasing distance of the light source from the deglaring plate. As a result, the apparent brightness of the generated circular luminous pattern may be maintained approximately constant or uniform.

Although in the example illustrated in FIG. 8 the lighting assembly 12 includes only a single perpendicularly displaceable planar element, in further examples the lighting assembly 20 might comprise a plurality of the planar structures shown, each comprising a plurality of light sources 22, and each individually moveable relative to the conical deglaring plate 16. This would allow for multiple sets of circles of differing sizes to be generated simultaneously on the visible surface of the deglaring plate, with each controlled to exhibit a differing rate or pattern of expansion or contraction.

Furthermore, although the example of FIG. 8 features a lighting assembly 20 of the type included in the embodiment of FIG. 2, the lighting assembly might in further examples be of a different type or structure. In particular, there may be provided in one or more examples a light source array of the type illustrated in FIG. 6, provided mounted between a set of perpendicular adjustment rails 48 to enable movement of the array perpendicularly with respect to the conical deglaring plate 16.

Figure 10:
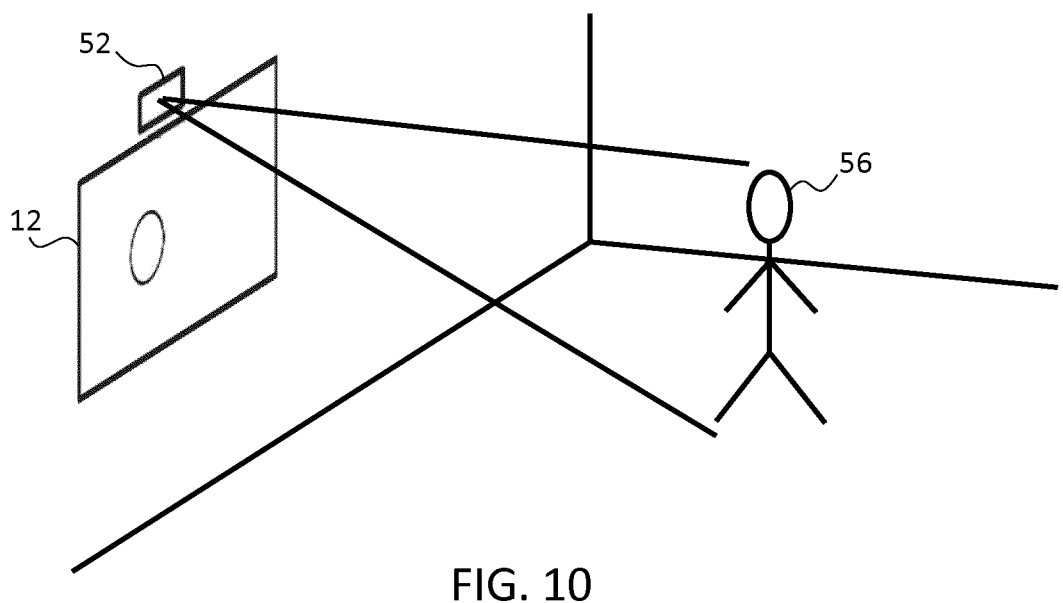
FIG. 10 schematically depicts a fourth example lighting device, comprising a position detection unit.

In accordance with one or more embodiments, the lighting device 12 may further comprise a position detection or position tracking unit, adapted to track a position of an observer of the device. An example is illustrated in FIG. 10. Here, an example lighting device 12 in accordance with embodiments of the invention is shown mounted to a wall of a room or space. Mounted above the primary body of the lighting device 12 is illustrated a position tracking unit 52 adapted to determine and monitor a spatial position of a user 56 located at some distance from the lighting device.

Although for illustrative purposes, the position tracker or detector 52 is shown as a separate unit mounted externally to the primary body of the lighting device 12, in alternative examples, the position tracker may be provided mounted within the housing of the lighting device 12 itself. There may be provided a window for instance to enable optical or other electromagnetic tracking signals to pass into and out of the housing.

The position tracking unit 52 may be adapted to determine a spatial location of a user relative to the lighting device 12. An arbitrary co-ordinate system might be defined, wherein the lighting device (or a point comprised by it) is defined as an origin, and user position information is expressed or processed in terms of said co-ordinate system.

A controller of the lighting device 12 may be adapted to control the configuration of the lighting assembly 20 so as to vary the generated luminous pattern on the conical deglaring plate in dependence upon the determined position of an observer or user 56.

For example, the controller may be operable to control the lighting assembly in such a way as to cause one or more aspects of the generated luminous pattern to follow an observer as they move laterally with respect to the display (where by laterally is meant in a direction parallel with a surface of the conical deglaring plate). This movement of aspects of the pattern may be achieved by controlling one or more of the light sources 22 comprised by the lighting assembly 20 to move (or to simulate movement) in synchronicity with the lateral movement of a tracked observer. In this way, the generated circular light patterns will appear to the observer to be following them as they move.

A plurality of the lighting devices 12 might be mounted in series along an interior surface of a room or space, and collaboratively controlled by one or more controllers to provide a luminous pattern which appears to follow an observer in their movements across all of the devices. A single controller may be provided operatively coupled with all of the devices, or independent controllers might be provided to each device, these controllers being communicatively coupled to one another.

In addition to lateral movement, the controller may be adapted to control the configuration of the lighting assembly 20 so as to vary the generated luminous pattern in dependence upon a determined distance or displacement of a user relative to the device. For example, a luminous output power or source brightness of one or more of the light sources may be controlled to vary in dependence upon an observer's distance from the lighting device.

Additionally or alternatively, a displacement of one or more of the light sources 22 relative to the conical deglaring plate 16 may be controlled to vary in dependence upon a user's position relative to the device. For example, as it is detected that a user has moved closer to the device 12, one or more of the light sources might move closer (or further) to (or from) the conical deglaring plate 16 in synchronicity. This would have the effect of causing the corresponding visible circular (or closed loop) light patterns to decrease in size (or increase in size) as the user moves closer, and to increase in size (or decrease) as the user moves further from the device. This would hence create an interesting, interactive luminous display which would engage and entertain an observer.

Further to this, a brightness or colour of one or more of the light sources 22 might be controlled to change in dependence upon a user's position relative to the device 12. Additionally or alternatively, more light sources or fewer light sources might be switched on as a user moves closer or further from the lighting device.

In further examples, a plurality of the devices 12 might be aligned along interior walls of a tunnel for example, and the controller configured to control the lighting assemblies 20 of the devices so as to generate a lighting pattern having one or more aspects which appear to follow an observer along the tunnel. Additionally or alternatively, one or more of the devices might be installed within close sight of users of a thrill ride for example. The device(s) may be controlled so as to generate a luminous pattern which appears to follow a user of the ride as they journey along the ride. Colour and/or size changing rings might be generated which travel along with the observer or spiral or turn around him or her for example.

As discussed, embodiments of the invention all make use of a conical deglaring plate 16 in order to generate dynamic luminous displays through projection of light outputs onto a surface of said plate. The typical structure of known conical deglaring plates is such as to generate from incident light spots a symmetrically circular ring of light on a reverse side of the plate. This symmetry arises due to the symmetrical circular shape of the base of each of the array of conical elements forming the structure of the plate.

In many instances, it may be advantageous or desirable to provide luminous patterns or displays which are composed of non-symmetric closed-curved forms, or which are composed of non-closed curves.

In accordance with a further set of embodiments of the invention, such alternative forms may be achieved through provision of certain optical adaptations or optical components adapted to manipulate the optical operation of the device so as to generate the desired non-symmetric and/or open curved luminous shapes. It is anticipated that features of any of the below embodiments may be advantageously combined with any of the other embodiments described in this document.

In accordance with a first example subset of embodiments, the lighting assembly 20 may further comprise one or more light-shaping masks arranged within the light path of one or more of the light sources 22, and adapted to shape the light output which is projected by each of said light sources onto the conical deglaring plate 16. In particular, the light-shaping masks (or baffles) may have a sectorial shape (e.g. the shape of a circle sector or ellipse major or minor sector). By projecting only a sector of the whole luminous output of a given light source, the circular symmetry of the luminous effect is broken, and an arc is generated by the conical deglaring plate rather than a fully closed circle. In particular, an arc is generated on the visible side of the conical deglaring plate having an angular extent matching, or commensurate with, the unshielded sector of the luminous output.

Figure 11:
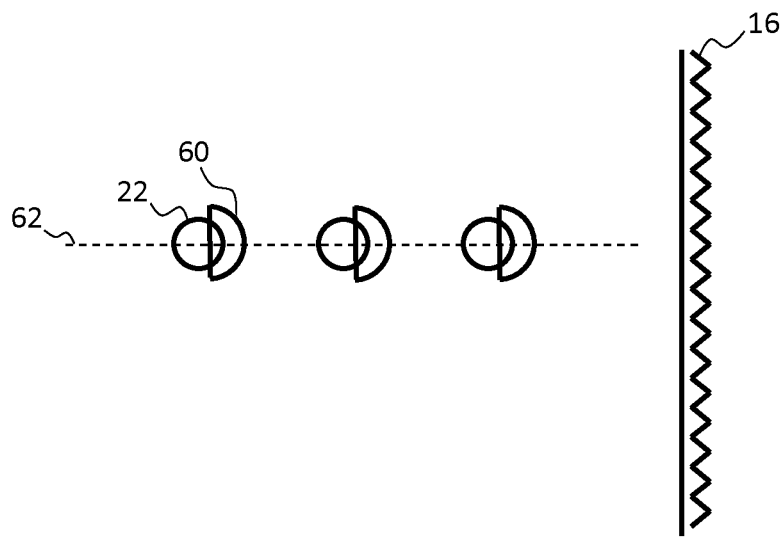
FIG. 11 schematically depicts a fifth example lighting device in accordance with one or more embodiments of the invention.

An example is schematically illustrated in FIG. 11, which shows a side or cross-sectional view through an example lighting device in accordance with one or more embodiments. The figure shows an arrangement of three example light sources 22 comprised by the lighting assembly, and their configuration relative to the conical deglaring plate 16. The light sources are axially aligned along a common axis 62 extending perpendicularly with respect to the deglaring plate 16. Each of the light sources is partially covered by a respective light-shaping mask element 60, arranged within the optical path of the light source, and adapted to shape the outgoing light emitted by the respective light source in the direction of the deglaring plate 16.

Figure 12:
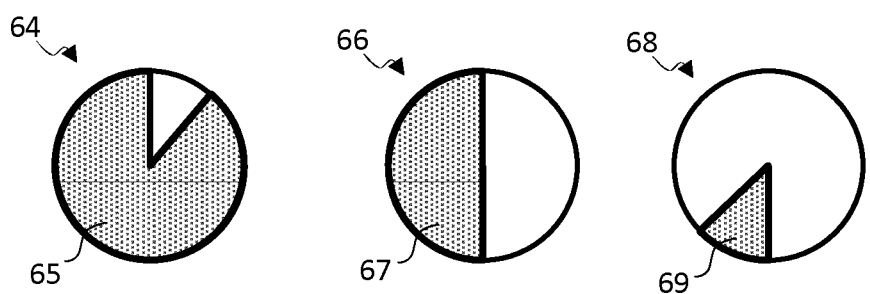
FIG. 12 schematically depicts example light-shaping masks as comprised by one or more embodiments of the invention.

An example set of three different possible light shaping mask elements 64, 66, 68 is schematically illustrated in FIG. 12. Each of the three masks elements consists of a light absorbing or deflecting plate or membrane having a substantially (circular) sectorial shape. The mask elements are adapted to block or shield the transmission of light falling incident at their respective surfaces 65, 67, 69, either through absorption or through deflection. This causes a portion of the transmitted light output generated by each of the thus masked light sources 22 to be suppressed or baffled. As a result, only a sectorial portion of the originally projected light output is transmitted to the incident surface of the conical deglaring plate 16. This has the effect of generating on the visible surface of the conical deglaring plate a local luminous pattern having the shape of an arc with an angular extent matching, or commensurate with, the unshielded sector of the luminous output generated by the respective light source 22.

The mask elements 60 may be planar or may alternatively be shaped so as to partially follow an outer shape or profile of a light emitting surface of the respective light source 22. This may enable any prevention of leakage of any stray light.

Figure 13:
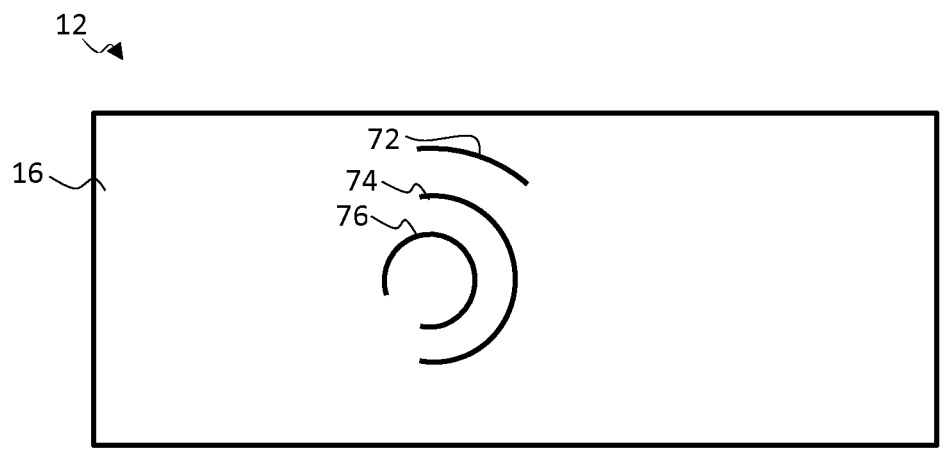
FIG. 13 schematically depicts an example luminous display generated on a visible surface of an example lighting device incorporating the light-shaping masks of FIG. 11.

The resultant generated luminous patterns are illustrated schematically in FIG. 13, which shows a visible external surface of the example lighting device 12 of FIG. 11, as may be seen by an observer. The arc-shaped luminous patterns generated by the masked luminous outputs of each of the three example light sources of FIG. 11 are shown across the front of the device (i.e. across the visible surface of the conical deglaring plate 16). Arc 72 corresponds to the pattern generated by the first mask element 64, arc 74 to the pattern generated by the second mask element 66, and arc 76 to the pattern generated by the third mask element 68.

As shown, the three arc-shaped patterns 72, 74, 76 are concentric with respect to one another. This arises due to the differing perpendicular displacements of each of the light sources 22 (and light-shaping elements 60) relative to the conical deglaring plate 16. As explained above, a more distantly positioned light source (relative to the deglaring plate) will produce a relatively larger corresponding local light pattern on the visible surface of the deglaring plate. A more closely positioned light source produces a relatively smaller light pattern. Hence, the axially aligned set of three light sources generates concentrically arranged (in this case arc-shaped) luminous patterns.

Although in the particular example of FIG. 11, the shielded light sources 22 are shown axially aligned, this is by way of one advantageous example only, and in further examples, light sources being similarly masked or shielded may be arranged in accordance with any desired configuration or pattern.

Furthermore, this example adaption may be advantageously combined with any of the example arrangements or control schemes or mechanisms described above in order to provide a dynamic luminous pattern on the deglaring plate 16 configured to vary as a function of one or more variables. For example a much larger array of light sources 22 may be provided, each being aligned optically with a respective light-shaping mask 60. These may in examples be controlled to simulate motion of a single light source relative to the deglaring plate. In further examples, one or more of the light sources may be controlled, in combination with the light-shaping mask 60 interposed within its luminous output, to physically move relative to the conical deglaring plate.

In accordance with a variant set of examples of the above-described arrangement, the intrinsic optics of one or more of the light sources 22 might be adapted to provide a similar effect to the light-shaping masks. The optics may include for example beam shaping elements configured to shape received light into a circle sector shape, eliminating light from the remaining sector portion of the output beam. The optics may include a suitable lens for example. Alternatively the optics may include light deflecting or absorbing elements for shaping a luminous output to form a sectorial shape.

By incorporating the beam shaping into the optics of the light sources 22 themselves, efficiency is greatly increased, since far less light is lost through absorption or deflection of the light-shaping masks.

As mentioned above, the example arrangement of FIG. 11 may be adapted or configured to provide a changing luminous pattern on the conical deglaring plate 16 in a number of different ways.

In one advantageous set of examples, the lighting assembly 20 is adapted so as to generate on the conical deglaring plate 16 a dynamic pattern of moving open curve (i.e. arc) shapes, adapted to vary in its formation and configuration in dependence upon one or more variables. These variables may for example include the example variables described above, such as a time variable (so that the pattern changes as function of time) or a determined or tracked position of a user relative to the display.

Figure 14:
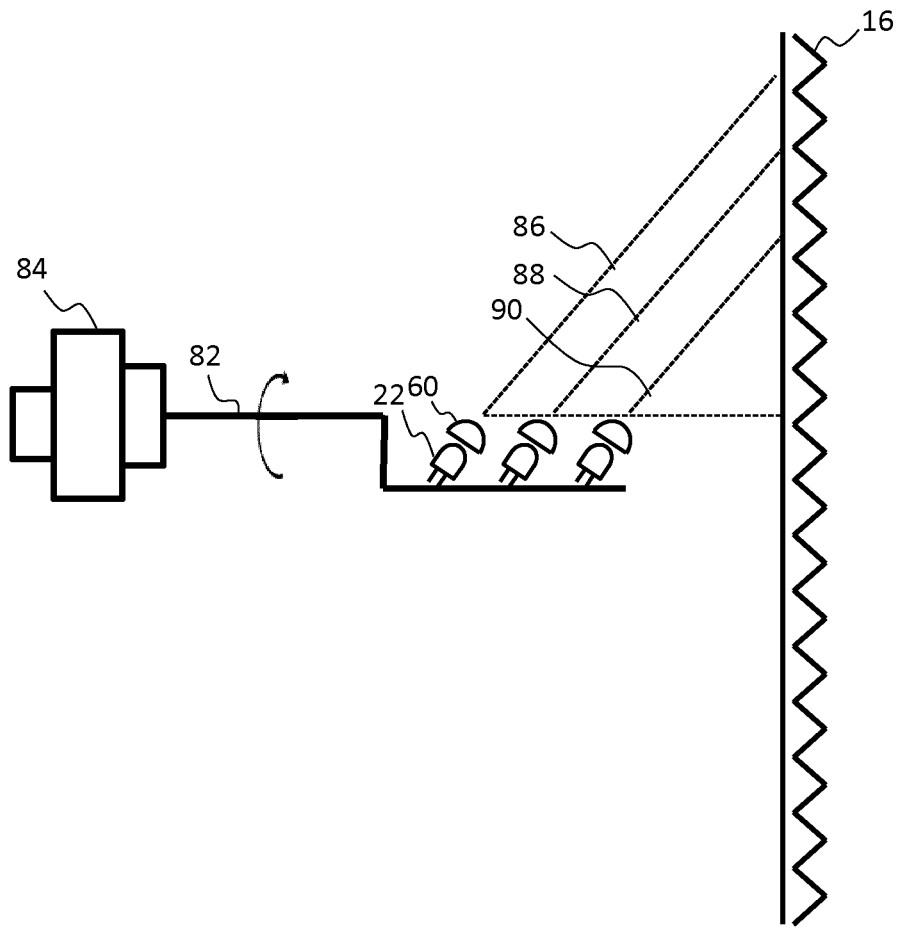
FIG. 14 schematically depicts a sixth example lighting device in accordance with one or more embodiments of the invention.

An example is schematically illustrated in FIG. 14, in which an example set of three light sources 22 are arranged mounted along the shaft of a rotatable spindle 82, aligned perpendicularly with respect to the conical deglaring plate 16. The shaft of the spindle may be crank-shaped, with the three light sources being mounted to a distal 'arm' portion of the spindle. A proximal shaft portion of the spindle is rotatably coupled to a motor mechanism 84, which is operable to induce rotation of the spindle about a longitudinal axis of the proximal shaft portion.

Each of the light sources 22 is provided with a respective light-shaping mask 60 arranged within an outgoing light path of the light source and adapted to shape the outgoing light output which is projected onto the incident surface of the conical deglaring plate 16. In particular, the light-shaping masks may have a sectorial shape so as to project a sectorial light output onto the deglaring plate, and thereby generate a corresponding arc-shaped luminous pattern on a visible surface of the deglaring plate.

A cross-section through the sectorial shaped light outputs projected onto the conical deglaring plate by each of the three light sources is illustrated schematically in FIG. 14 by beams 86, 88, and 90. Each beam generates a sector shaped luminous pattern on the incident surface of the conical deglaring plate which extends from a point on the plate approximately, and preferably exactly, opposite to the spindle 82 to a further radially displaced point. If the apex of the sector does not coincide exactly with the rotation axis of the spindle 82, this may result in a non-exposed or a double-exposed area on the deglaring plate which may cause undesired artefacts in the luminous pattern or image generated on the reverse side of the deglaring plate. Where the sector is very thin, each projected beam pattern may approximate to a radial line-shape.

The lighting device further comprises a controller (not shown), operatively coupled with the motor mechanism 84, and configured to control rotation of the spindle 82 in order thereby to effect a corresponding revolving motion of the generated light outputs 86, 88, 90 across the incident surface of the conical deglaring plate 16. As a result, a corresponding dynamic pattern is generated across a visible surface of the conical deglaring plate consisting of a concentric set of (in this case three) arc shapes rotating at a particular rate.

In examples, the rate of rotation may be controlled to vary in dependence upon one or more variables. The speed of rotation may for example be controlled to vary in dependence upon a time variable, such that the rotation pattern changes as a function of time. Alternatively, rotation speed may be controlled to change as a function of any other variable, including for example a detected observer position, as in the example of FIG. 10 described above.

The motor mechanism 84 may in examples comprise an optical angular encoder, and functionally associated optical sensor, for informing angular control of the rotational positioning of the spindle 82. A controller comprising the optical angular encoder might be incorporated into the rotor part of the motor mechanism in accordance with some examples, with the optical sensor being mounted statically within the stator. Power might be transported between the rotor and stator by means of interposing rotary slider contacts, or alternatively by means of a rotary transformer. This arrangement may minimise the necessary number of rotary connections. Additionally, the optical encoder may be adapted in accordance with some examples to transmit data wirelessly, thereby further minimising required wiring.

Although in the example of FIG. 14, an arrangement of only three light sources 22 is shown, this is by way of clarity of illustration only. In other examples, a larger number of light sources may be provided. In particular examples, one or more strips of electrically connected light sources (for instance RGB LED strips) may be provided. Strips of RGB LEDs comprising an associated integrated drive circuit for each LED are commercially available and will be well-known to the skilled person.

Furthermore, in additional examples, there may be provided a plurality of the axially aligned arrangements of light sources and light-shaping masks shown in FIG. 14, each configured to be rotatable about a respective axial axis. The plurality of arrangements may be positioned for example at differing distances from the optical deglaring plate 16. This may create light patterns on a visible surface of the deglaring plate which exhibit aesthetically interesting depth effects.

It is further emphasised that the illustrated optical outputs 86, 88, 90 generated by the light sources 22 in the example of FIG. 14 are purely schematic. In particular, the specific cut-off angles shown for each of the generated output beams are not an essential feature of this embodiment, and in alternative examples, this cut-off angle may be different, in accordance with the requirements of the particular embodiment.

It will also be readily appreciated by the skilled person that the arrangement of FIG. 14 may in further examples be advantageously combined with features of any of the example arrangements or control schemes or mechanisms described above in order to provide a dynamic varying luminous pattern on the deglaring plate 16 configured to vary as a function of one or more variables.

In the above example, a rotating arrangement of axially aligned light sources 22 is provided in order to generate a dynamically varying pattern of rotating arc-shaped light patterns. This provides an interesting and attractive display which might be controlled to vary in its speed of rotation or in one or more other optical configurations in dependence upon one or more variables.

It has further been realised by the applicant however that the arrangement of FIG. 14 may, in further examples, be controlled in a more formally co-ordinated manner to create on the conical deglaring plate 16 more complex shapes and moving images. This arises from the fact that any shape or image may be deconstructed into a set of radially concentric curves (i.e. may be represented in polar co-ordinates). Hence, by carefully controlling the set of axially aligned light sources 12 and masks 60 illustrated in FIG. 14, it is possible to generate any arbitrary pattern or image on the deglaring plate. In particular, each light source may be driven in a scan-line type fashion so as to 'sketch out', or describe, circumferential components of a composite image or shape.

With reference again to FIG. 14, each composing curve or arc of the desired composite image is associated with one of the plurality of axially aligned light sources 22. Composing arcs of a smaller radius are generated by the light sources closer to the conical deglaring plate 16, and the angular extent of each arc is commensurate with the angular extent of the respective sectorial shields 60 associated with the given light source.

The light sources 22 may each be shielded to emit a very thin sector, so as to generate on the deglaring plate 16 a sectorial shape approximating a radial line. By rotating the light sources 22 and mask elements 60 by means of the motor mechanism 84, the projected sectorial shape may be controlled to rotate in corresponding fashion. By appropriately controlling the intensity of the light source as a function of the rotation angle, each light source may be controlled to effectively project any particular arc which is desired.

For example, by controlling a given light source to emit at 100% possible brightness between 0° and 180°, and 0% brightness between 180° and 360°, an arc of exactly semi-circular shape may be produced on the deglaring plate. If the speed of rotation is sufficiently fast, an observer will perceive all angular sections of the 180° arc as being illuminated simultaneously. For example, the rate of rotation may be similar to the minimum frame rate required for moving pictures to prevent the appearance of flicker. This may for example be 24 revolutions per second or greater.

When the plurality of aligned light sources 22 are controlled simultaneously in this manner, a corresponding plurality of arbitrary concentric arcs may be generated on the conical deglaring plate. By controlling the light sources appropriately, any desired image may be reconstructed from the multiplicity of the arcs.

In examples, a reconstructed image may be controlled to change over time through appropriately changing the output power versus radial displacement function in accordance with each new desired image frame which is to be constructed.

In accordance with a variant set of examples, the light-shielding masks 60 may be replaced by dedicated optics integrated into the light sources 22 themselves, adapted to output a thin sector of light having the same directional and intensity characteristic, but offering greatly improved optical efficiency (greatly reduced light loss). In this way, the brightness of the generated images may be maximised.

Although in the particular example of FIG. 14, only one rotating system is provided, in further examples, a lighting device may be provided comprising a plurality of these rotating electro-optical systems. This may enable multiple moving or changing images to be generated simultaneously on the conical deglaring plate 16. In more particular examples, a plurality of rotating systems may be positioned at different respective distances from the deglaring plate 16. This may enable static or moving images to be generated on a visible surface of the conical deglaring plate exhibiting interesting depth effects.

To achieve a high degree of axial sharpness of the generated circular sectorial components, the rays of the beam from each light source 22 may have a focus point or a caustic as close as possible to the mechanical rotation axis (i.e. the longitudinal axis of the spindle 82). This may achieved for example through provision of a further optical component, such as a lens, in combination with each light source 22 for focussing the light output of the light source to a point on said mechanical rotation axis. Alternatively, the intrinsic optics of each light source 22 may be adapted to provide the required focus point for the light emitted from the light source.

To achieve a high degree of tangential sharpness of the generated circular sectorial components, the sector width of each projected beam 86, 88, 90 should preferably be as small as possible.

Furthermore, the controller may be adapted to control changes in intensity of the light sources 22 at a fast enough rate (given the motor mechanism 84 revolution speed) in order to maximise the tangential sharpness and/or maximise circumferential resolution.

To achieve approximately uniform brightness of the generated image, the intensity of the plurality of light sources 22 may be configured to be proportional to their perpendicular distance from the conical deglaring plate 16.

Furthermore, as noted above, to prevent image flicker, the revolution speed should be sufficiently high, for example at a rate of 24 revolutions per second. However, the specific speed required may depend upon a number of contingent factors including the brightness of the image, and the brightness of the surroundings. The required rotation speed may therefore well exceed 24 revolutions per second. The issue of flicker is discussed in detail for example in the document Perz, M., Vogels, I. M., & Sekulovski, D. (2013). Evaluating the Visibility of Temporal Light Artifacts. In *Proceedings of Lux Europa* 2013—*the 12th European Lighting Conference*. Krakow.

In accordance with one or more examples, the generated circle components or arcs may be controlled to exhibit grey shades instead of only black and white, by rapidly controlling the intensity of the light source that corresponds with that circle in a gradual way instead of just on-off. In this way, a light effect is created similar to that generated through standard pulse width modulation techniques, but wherein intensity is varied across a given spectrum, rather than simply pulsed on and off.

In further examples, the light sources 22 may include LEDs of a plurality of different colours. The light sources may comprise RGB LEDs for example. This may enable colour images to be generated. In these cases, it may be advantageous to superimpose the rays of different colours in order to generate a combined colour output at each of the light source positions illustrated in the example of FIG. 14. Multiple coloured outputs may be combined through a single lens system at each light source position by means of interference filters as known from LED beamers for example.

In accordance with one set of example variations, the light sources 22 may comprise semiconductor lasers instead of LEDs or other light sources in order to maximise brightness.

In accordance with any described embodiment, one or more further optical variations may be made to the conical deglaring plate 16 in order to introduce variations in the generated luminous patterns.

In one set of examples, light absorbing or deflecting structures may be affixed onto a surface of one or more of the basic conical optical structures forming the structure of the conical deglaring plate 16. These structures may be shaped and positioned so as to block or suppress certain sections of the circular light shape otherwise generated by the given conical element. As mentioned above, the symmetrical shape of the generated light pattern arises due to the symmetry of the conical elements of the deglaring plate. By blocking light across a shaped (e.g. sectorial) section of the cone, an open curve shape may instead be generated.

Figure 15:
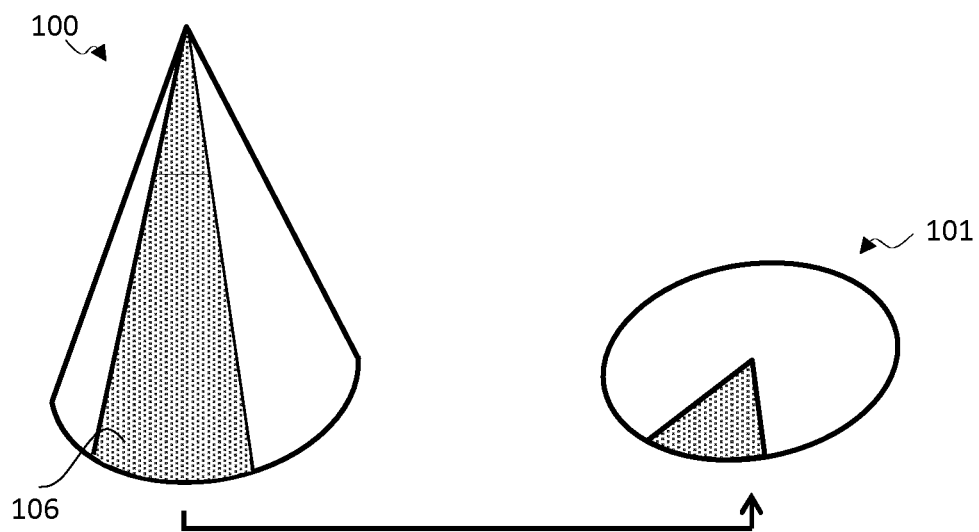
FIG. 15 schematically depicts an example adapted conical optical structure as comprised by one or more embodiments of the invention.

An example is illustrated in FIG. 15 which shows an example conical element 100 as comprised by an example conical deglaring plate 16. A sectorial portion of the tapered major surface of the cone is covered by a shaped mask element 106, thus blocking light from being transmitted through the corresponding section of the cone element. A projection of the mask element as seen from the base 101 of the conical structure is shown on the right hand side of FIG. 15.

As discussed above, the conical deglaring plate is oriented such that light is received though the bases of the conical structures 100, and transmitted out through the tapered surfaces. Hence the mask element 106 prevents a sectorial portion of an otherwise circularly symmetric light output from being transmitted through the tapered surface of the cone.

The light shaping mask 106 changes the shape of the corresponding light pattern generated on the visible surface of the deglaring plate. In particular, an arc-shaped luminous pattern is created rather than a circular pattern. This may typically have an angular extent matching or commensurate with the angular extent of the remaining uncovered portion of the conical structure 100.

Additionally or alternatively, in accordance with one or more example embodiments, the shape of the basic conical elements forming the conical deglaring plate 16 might be adapted so as to provide differing luminous patterns on the visible surface of the deglaring plate. The shape may be adapted for example so as to generate a similar optical effect as the light absorbing structures describe above (i.e. to generate open arc shapes).

Figure 16:
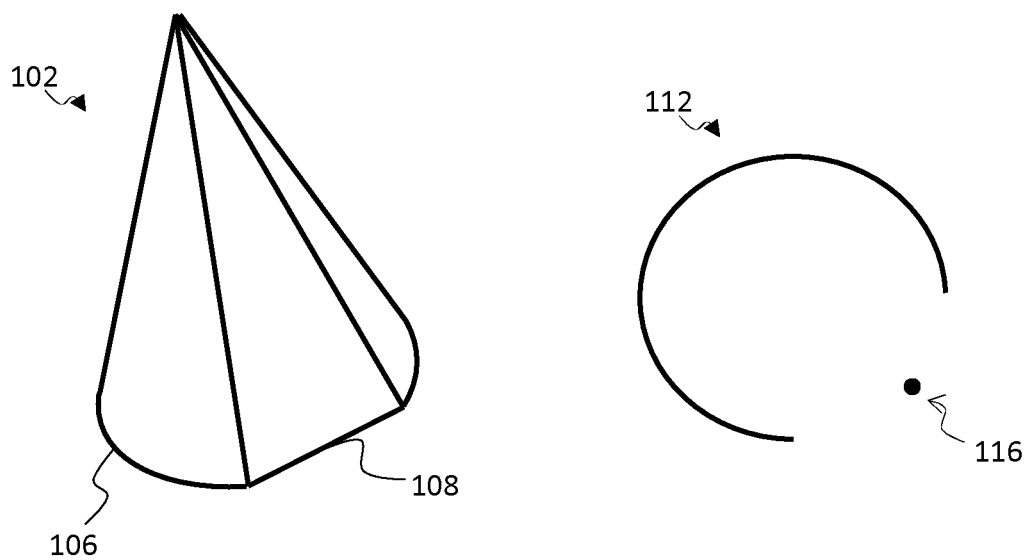
FIG. 16 schematically depicts a second example adapted conical optical structure as comprised by one or more embodiments of the invention.

An example is illustrated in FIG. 16 in which a segmental portion of an example conical optical structure 102 has been cut or ground away to leave a 'segmentally truncated' conical structure. 'Segment' is to be interpreted in its geometrical sense as indicating a portion of a circle delimited by an arc and a chord of the circle. The cross section of the truncated cone 102 thus has the form of a major circle arc 106 which is closed or bounded by a chord 108. The thus segmentally truncated cone has an outer surface which includes at least one planar surface section extending from the apex of the cone to the base of the cone. This planar surface section essentially defines the above-mentioned chord bounding the cross-section of the structure.

In this case, the optical operation of the conical structure 102 is disrupted, and in place of a circle-shaped luminous pattern, an arc-shape is instead generated, with a small point of light projected in the space where the missing arc would otherwise have been. An example of the luminous pattern 112 generated is shown on the right hand side of FIG. 16. The pattern consists of an arc having an angular extent matching or commensurate with an angular extent of the remaining segmentally reduced cross-section.

Symmetrically disposed between the two ends of the arc, and on the same circle as defines the arc is generated a point or dot of light 116, formed in place of the 'missing' arc shape of the circle that would otherwise have been formed. This dot of light is formed from the light that would otherwise have formed this missing arc shape, and hence outputs the same luminous flux as would have been output by this missing arc.

In accordance with further examples, one or more of the conical optical structures may have a cross-section which is truncated by removal of more than one segmental portion. In this case, an arc shape is generated on a visible surface of the deglaring plate in combination with a plurality of luminous dots or points, each aligned centrally along a respective 'missing' arc shape defined by the respective 'missing' segment portion.

Although in the particular example of FIG. 16, one or more of the conical optical structures is shaped so as to have a segmentally truncated cross-section, in alternative examples one or more of the conical optical structures may differently truncated. In particular examples, one or more of the structures may be modified so as to leave a truncated cone having a concave cross-section. The cross-section may be shaped for instance such that chord 108 in the example of FIG. 16 is instead replaced by a concavely curved boundary (extending concavely in toward the body of the cone). Such concave cross-sections may enable improved tessellation of the conical optical structures, allowing for greater density of conical structures, or allowing for a smaller overall surface area of the deglaring plate.

In accordance with one or more examples, visibility requirements for lighting device may mean that patterns generated by the plate are required only be visible to onlookers across a particular limited range of viewing angles. This may be due to particular conditions or circumstances of its installation for instance. In such cases, it may be that a certain portion of the light directed from at least a subset of the conical structures is wasted, in the sense that it is directed toward locations at which no observers will ever be present to see it. In accordance with these cases, this subset of the conical optical structures may each be truncated so as to remove the particular portion of the respective cone which would otherwise emit the wasted or unnecessary light. In particular examples, these removed portions may be shaped so as to leave a cone having a concavely truncated cross-section (as described above). This may enable improved tessellation of the conical optical structures.

In further examples, the optical deglaring plate may comprise or include non-conically shaped prismatic optical structures, such as optical pyramid structures. In this case, no arc is created, but rather a set of symmetrically arranged dots or points is generated, each aligned with a centre point of a respective one of the faces of the pyramid. Use of non-conical structures having square or hexagonal bases for instance also improves tessellation of the structures, allowing more optical elements per unit area.

Pyramid and cone structures may be combined in example optical plates so as to form a luminous pattern consisting of arc and circle shapes in combination with dot arrangements.

In particular, the optical deglaring plate may in examples comprise at least one of:

a combination of conical optical structures and non-conical optical structures for optically processing received light; and a combination of segmentally truncated conical optical structures as described above, and non-truncated conical optical structures.

Where a deglaring plate is provided comprising a combination of non-truncated cones and segmentally truncated cones and/or a combination conic structures (segmented or not) and non-conic structures, there is generated a pattern on the visible side of the deglaring plate comprising a combination of circles or arc shapes with the dots or points described above. This may provide an interesting aesthetic effect, or may for example be utilised as part of the image-generating control regime described above to construct images from a set of concentric arcs, circles and/or dots.

Additionally, or alternatively, in accordance with any example embodiment, one or more of the conical structures may be replaced by, or reformed into, a prismatic optical structure having a different basic shape. In particular, prismatic elements having a polygonal base shape might be formed or incorporated into the conical deglaring plate. Replacing the circular base with a regular polygon results in the generation of a number of visible bright spots arranged at regular intervals about a circle, where the number of generated spots is equal to the number of sides of the polygon.

Furthermore, in accordance with any example embodiment, the shape or structure of the conical optical structures forming the conical deglaring plate 16 may be configured so as to vary at different positions across the plate. In particular, it is known that when viewed at an oblique angle, circular patterns formed on a visible surface of the plate 16 tend to appear more elliptical. In accordance with one or more examples therefore, the shape and/or size of the bases of the conical elements might be varied across the plate structure in order to ensure that generated circular patterns continue to appear circular in shape at any or all viewing angles.

For example, the base shape of the conical structures may be adapted to be elliptical, with eccentricity and major axis varying across the plate. The opening angle (i.e. top angle) of the cone structures may also vary as a function of position across the deglaring plate. Additionally, the pitch of the array of conical structures may vary across the plate. One or more of these parameters may vary by way of example along an x direction, a y-direction, and/or a radial direction for instance.

Applications for the lighting devices are numerous. The devices are designed to generate an eye-catching and exciting luminous display. They are therefore ideally suited for any application in which such a display may be of value or utility. Examples include, but are not limited to:

trade fairs (to catch the eye and attract the interest of passers-by)

in-shop brand imaging waiting lines (to entertain queuing persons)

tunnels and passages, elevators, escalators, mechanical walkways, e.g. at railway stations, airports shop windows water slides in swimming pools adventure rides (e.g. to provide a view or display from moving cars of the ride)

Olympic games disco dance floor incorporated into an exterior visible surface of a luminaire (to provide additional aesthetic effect to the illumination function)

transparent flower vase (small-scale examples of the device might be installed in side walls of the vase. These could be powered by batteries for example)

champagne or white wine cooler (although here, condensing water may influence the optical effect, and so the device may be installed inside a double-walled cavity). The device in this case may further comprise or be connected with a thermometer, and be controlled to change a generated luminous pattern in dependence upon the temperature. Additionally, powering of the device might be achieved through thermopile or another form of energy harvesting, so that there is no need to replace batteries, and hermetic sealing can as a result be better provided.

installation within beverage vessels, e.g. a glass coffee mug. Here, energy for powering the device might for example be harvested form the heat of the beverage.

buildings having a glass front, visible for example from a highway or railroad.

greenhouses near airports (beaming vertically, visible from an airplane).

A plurality of the lighting devices might be arranged across one or more walls of a space or room. The devices might be contiguously arranged with one another, for example stacked vertically or horizontally along a wall or other interior surface.

Lighting devices might be used in example applications to draw attention to other display elements, such as advertisements or information displays.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device, comprising:
   an optical deglaring plate comprising an array of conical optical structures for optically processing received light;
   a lighting assembly comprising a plurality of light sources, the lighting assembly being adapted to project a plurality of light outputs onto an incident surface of the optical deglaring plate, the light outputs combining to generate a luminous pattern on said incident surface; and
   a controller adapted to control a configuration of the lighting assembly so as to vary the luminous pattern in dependence upon one or more variables,
   wherein one or more of the plurality of light sources are moveable relative to the optical deglaring plate, and
   wherein the controller is adapted to control movement of said one or more light sources in order to vary the luminous pattern,
   wherein the lighting assembly comprises one or more light-shaping arrangements, each comprising at least one of the plurality of light sources and at least one light shaping mask arranged in the light path of the at least one of the plurality of light sources for altering a shape of a respective light output projected by the arrangement onto the optical deglaring plate, and
   wherein the at least one light shaping mask of one or more of said light-shaping arrangements is moveable relative to the optical deglaring plate, and wherein the controller is adapted to control movement of said at least one light-shaping mask in order thereby to vary the luminous pattern.

2. A lighting device as claimed in claim 1, wherein the optical deglaring plate defines a plane, and wherein
   one or more of the light sources is moveable in a direction parallel with said plane to thereby vary a relative positioning of a respective one or more luminous outputs within the luminous pattern, and/or
   one or more of the light sources is moveable in a direction perpendicular with said plane to thereby vary a size of a respective one or more luminous outputs within the luminous pattern.

3. A lighting device as claimed in claim 1, wherein the optical deglaring plate defines a plane, wherein one or more of the light sources is moveable in a direction perpendicular with said plane to thereby vary a size of a respective one or more luminous outputs within the luminous pattern, and wherein the controller is further adapted to vary an output intensity of each of said one or more moveable light sources in dependence upon a perpendicular displacement of each light source with respect to the optical deglaring plate.

4. A lighting device as claimed in claim 1, wherein said one or more variables includes a time variable, such that the luminous pattern is controlled to vary as a function of time.

5. A lighting device as claimed in claim 1, further comprising a position detection module adapted to determine a position of an observer, and wherein the one or more variable parameters includes said determined position of the observer.

6. A lighting device as claimed in claim 1, wherein the lighting device comprises a plurality of said light-shaping arrangements axially aligned in a row extending perpendicularly with respect to the optical deglaring plate, the arrangements each adapted to be rotatable about a common axis of alignment, and
   wherein the controller is adapted to control rotation of each of the plurality of light-shaping arrangements in order thereby to vary the luminous pattern.

7. A lighting device as claimed in claim 6, wherein said plurality of light-shaping arrangements are mounted axially along the length of a spindle, the spindle having a longitudinal axis, and wherein the controller is adapted to control rotation of said spindle about said longitudinal axis in order thereby to vary the luminous pattern.

8. A lighting device as claimed in claim 6, wherein the controller is further adapted to vary an output intensity of the light source comprised by each light-shaping arrangement as a function of rotation angle.

9. A lighting device as claimed in claim 1, wherein one or more of said conical optical structures has a segmentally truncated cross-section, the cross-section having the shape of a circle reduced by one or more segment portions, for generating an open curve shaped luminous pattern on a visible surface of the optical deglaring plate from the processing of received light.

10. A lighting device as claimed in claim 1, further comprising one or more light-shaping masks attached to one or more surfaces of one or more of said conical optical structures for altering said optical processing of the received light.

11. A lighting device as claimed in claim 1, wherein the array of conical optical structures comprises conical optical structures having a segmentally truncated cross-section, the cross-section having the shape of a circle reduced by one or more segment portions, and conical optical structures having a non-truncated cross-section.

* * * * *